Patented Dec. 7, 1943

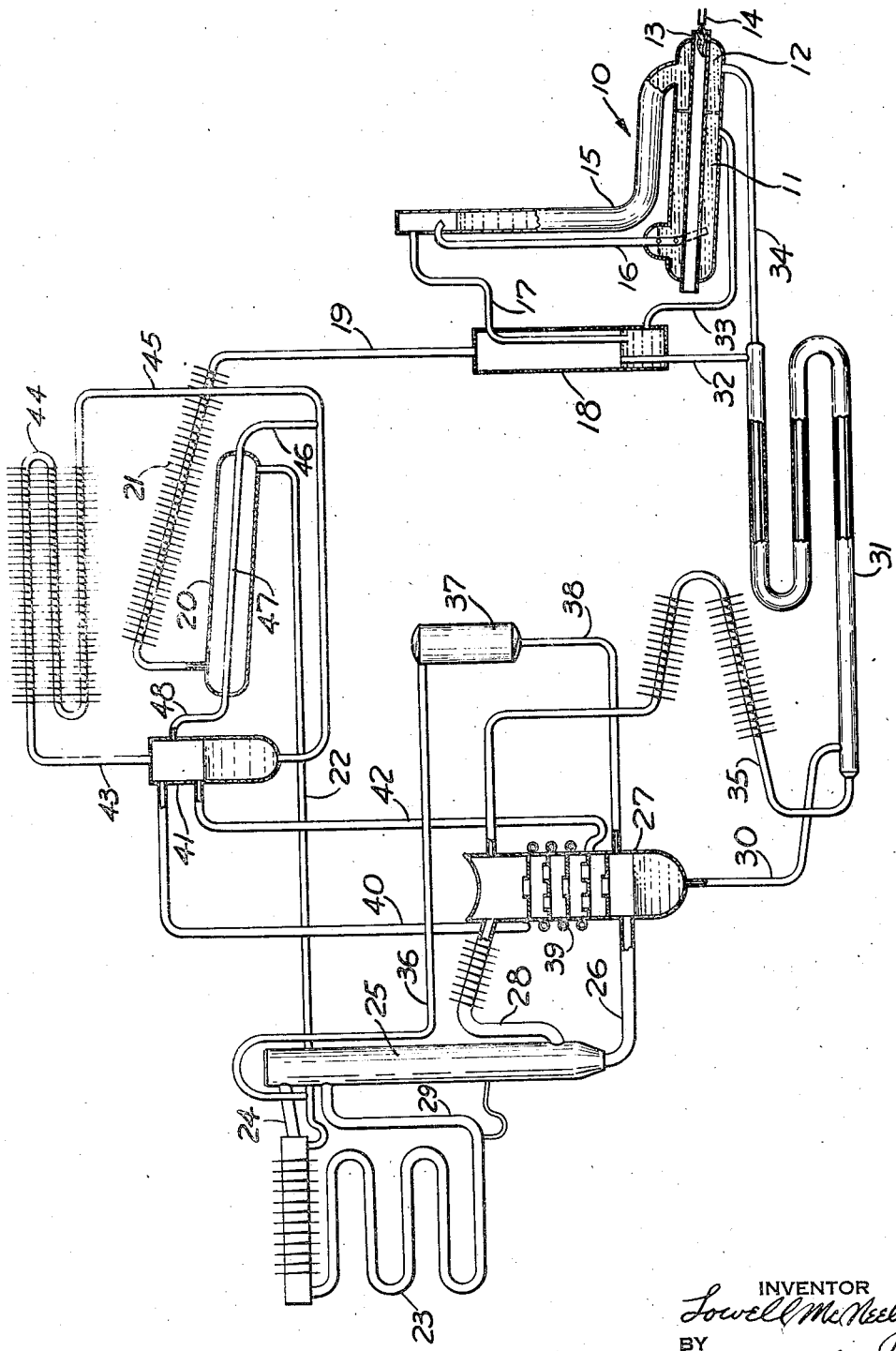

2,336,411

UNITED STATES PATENT OFFICE 2,336,411

REFRIGERATION

Lowell McNeely, Evansville, Ind., assignor to Servel, Inc., New York, N. Y., a corporation of Delaware Application September 20, 1941, Serial No. 411,617

5 Claims. (Cl. 62—119.5)

My invention relates to refrigeration and more particularly to cooling of heat rejecting parts of refrigeration apparatus.

It is an object of the invention to provide a circuit for heat transfer fluid for transferring heat, for instance, from the absorber and condenser of absorption refrigeration apparatus to an ultimate cooling medium such as air, such circuit embodying known concepts but being improved in that a constant quantity of cooling fluid is maintained in heat exchange relation with the condenser, independent of operating conditions and substantially independent of charge, which improvement also ensures detection of leak in the circuit before increase in pressure due to lack of cooling of the condenser.

The single figure of the drawing shows more or less diagrammatically a diffusion type absorption refrigeration system embodying the invention.

A generator 10 has a horizontal portion divided into a chamber 11 and a chamber 12. A flue 13 is located in the horizontal part of the generator for heating the liquid in chambers 11 and 12. A gas burner 14 is arranged so that its flame is projected into the lower end of flue 13. A standpipe 15 is connected at its lower end to chamber 12. A vapor lift conduit 16 is arranged with its lower end projecting downward into chamber 11 and its upper end connected to the upper part of standpipe 15. A conduit 17 connects the top of standpipe 15 to an analyzer 18. The top of analyzer 18 is connected by a conduit 19 to one end of a conduit 20. A part of conduit 19 is provided with fins 21 and forms a rectifier. The other end of condenser 20 is connected by a conduit 22 to the top of an evaporator 23. The upper end of evaporator 23 is connected by a conduit 24, one passage of a gas heat exchanger 25, and a conduit 26 to the lower part of an absorber 27. The upper part of absorber 27 is connected by a conduit 28, the other passage of gas heat exchanger 25, and a conduit 29 to the lower end of evaporator 23.

The bottom of absorber 27 is connected by a conduit 30, the outer passage of a liquid heat exchanger 31, and a conduit 32 to the analyzer 18. A conduit 33 connects the analyzer 18 to the generator chamber 11. Generator chamber 12 is connected by a conduit 34, the other passage of liquid heat exchanger 31, and a conduit 35 to the upper part of absorber 27.

The condenser outlet conduit 22 is connected by a conduit 36 to a vessel 37 which is connected by a conduit 38 to the absorber 27.

The above described system is charged with a solution of refrigerant in an absorption liquid, for instance, a thirty percent solution of ammonia in water, and an auxiliary pressure equalizing fluid such as hydrogen gas.

In operation, heat from the burner 14 in flue 13 causes expulsion of ammonia vapor from solution in generator chambers 11 and 12. The vapor expelled in chamber 12 rises through standpipe 15 to the upper end of this pipe. Vapor expelled in chamber 11 rises through lift conduit 16 raising with it liquid from chamber 11 into the upper end of standpipe 15.

The raising of liquid through lift conduit 16 causes the surface level of liquid in standpipe 15 to rise to such a level that liquid flows through the remainder of the liquid circuit by gravity flow. Weakened absorption liquid flows from generator chamber 12 through conduit 34, liquid heat exchanger 31, and conduit 35 to the upper part of absorber 27. The liquid flows downward in absorber 27, absorbing ammonia vapor out of the atmosphere in the absorber. Enriched absorption liquid flows from the bottom of absorber 27 through conduit 30, liquid heat exchanger 31, conduit 32, analyzer 18, and conduit 33 to the generator chamber 11.

Ammonia vapor from the upper end of standpipe 15 flows through conduit 17 and bubbles through liquid in analyzer 18. The vapor flows from analyzer 18 through conduit 19 to condenser 20. The vapor is condensed to liquid in condenser 20. The liquid condensate flows from condenser 20 through conduit 22 into evaporator 23.

The liquid flows downward in evaporator 23, evaporating and diffusing into hydrogen, the evaporation producing a refrigerating effect for cooling, for instance, a refrigerator storage compartment in which evaporator 23 is adapted to be located. The resulting mixture of gas and vapor flows from the upper end of evaporator 23 through conduit 24, gas heat exchanger 25, and a conduit 26 into absorber 27. Weak gas flows from absorber 27 through conduit 28, gas heat exchanger 25, and a conduit 29 back to the evaporator 23.

The absorber 27 is provided with a cooling coil 39. The upper end of coil 39 is connected by a conduit 40 to the upper part of a vessel 41. The intermediate part of vessel 41 is connected by a conduit 42 to the lower end of absorber cooling coil 39. The top of vessel 41 is connected by a conduit 43 to the upper end of an air cooled condenser 44. The lower end of condenser 44 is connected by a conduit 45 to the bottom of vessel 41. The lower end of condenser 44 is also connected by a part of conduit 45 and a conduit 46 to a cooling coil 47 located in condenser 20. The other end of condenser cooling coil 47 is connected by a conduit 48 to the upper part of vessel 41. The absorber and condenser cooling system as just described is evacuated and charged with a volatile heat transfer fluid such as, for instance, methyl chloride. Heat from absorber 27 causes the methyl chloride to vaporize in coil 39. Heat from condenser 20 causes methyl chloride to vaporize in condenser cooling coil 47. Vapor from coil 39 flows through conduit 40 into vessel 41. The vapor from coil 47 flows through conduit 46 into vessel 41. The vapor from vessel 41 flows through conduit 43 to condenser 44. The liquid flows from condenser 44 through conduits 45 and 46 into coil 47 and vessel 41. The liquid overflows from vessel 41 to conduit 42 into coil 39. The upper end of conduit 42 is connected to vessel 41 so that this overflow point is above the condenser 20. The surface level of liquid in the condenser cooling coil 47 is substantially the same as the level of the overflow point determined by the connection of conduit 42 to vessel 41. Thus, the surface level of liquid for cooling condenser 20 is substantially constant at this level of overflow.

Should a leak develop in the heat transfer or cooling circuit just described, the situation will become known by increase in temperature of evaporator 23 on account of increase in temperature of absorber 27, and before the pressure in the refrigeration system has risen due to failure of cooling of the condenser 24.

Various changes and modifications may be made within the scope of the invention as set forth in the following claims.

What is claimed is:

1. In combination with an absorption refrigeration system having an absorber and a condenser at a level above said absorber, a heat transfer circuit containing heat transfer fluid and having a heat absorbing portion for cooling said absorber, a second heat absorbing portion for cooling said condenser, and a heat disposal portion, said second heat absorbing portion receiving cooling fluid from said heat disposal portion, and said first heat absorbing portion receiving cooling fluid from said heat disposal portion by overflow from a level above said second heat absorbing portion.

2. In combination with refrigeration apparatus having a plurality of heat rejecting parts at different elevations, a heat transfer circuit having a heat absorbing portion for cooling one of said heat rejecting parts at a lower elevation, a second heat absorbing portion for cooling one of said heat rejecting parts at a higher elevation, a heat disposal portion, said second heat absorbing portion being arranged to receive cooling fluid from said heat disposal portion, and said first heat absorbing portion being arranged to receive cooling fluid from said heat disposal portion by overflow from a level above said second portion.

3. A refrigeration system having a plurality of heat rejecting parts at different elevations, a vaporization-condensation heat transfer circuit having a first vaporization portion for cooling one of said heat rejecting parts at a lower elevation, a second vaporization portion for cooling one of said heat rejecting parts at an upper elevation, and a condenser connected to receive vapor from both said vaporization portions, said second vaporization portion receiving condensed cooling fluid from said condenser, and said first vaporization portion receiving cooling fluid from said condenser by overflow from a level above that of said second vaporization portion.

4. An absorption refrigeration system having an absorber, a condenser at an elevation above said absorber, a vaporization-condensation heat transfer circuit having a vaporization portion in heat exchange with said absorber, another vaporization portion in heat exchange relation with said condenser, and a condensation portion connected to receive vapor from both of said vaporization portions, flow of condensate from said condensation portion taking place directly by gravity to the upper vaporization portion, and to the lower of said vaporization portions by overflow from a level above that of the upper vaporization portion.

5. A continuous type absorption refrigeration system having an absorber and a condenser acting concurrently as heat rejectors, a cooler for said absorber, another cooler for said condenser, a supply of cooling liquid for said coolers, said coolers being connected in parallel and arranged to so receive liquid from said supply that said absorber cooler receives cooling liquid only when said condenser cooler is adequately supplied with cooling liquid.

LOWELL McNEELY.